(12) United States Patent
Fetter et al.

(10) Patent No.: US 8,352,212 B2
(45) Date of Patent: Jan. 8, 2013

(54) MANIPULABLE AID FOR DIMENSIONAL METROLOGY

(75) Inventors: William Fetter, St. Charles, IL (US); Eric John Bennett, Fond du Lac, WI (US); Wilhelmus Weekers, East Greenwich, RI (US); Gary W. Russell, East Greenwich, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 577 days.

(21) Appl. No.: 12/621,002

(22) Filed: Nov. 18, 2009

(65) Prior Publication Data

US 2011/0119025 A1   May 19, 2011

(51) Int. Cl.
*G01B 5/008* (2006.01)
(52) U.S. Cl. .............................. 702/152; 33/503; 700/258
(58) Field of Classification Search .................. 702/150, 702/152, 153, 155, 159, 167, 168, 95; 33/503, 33/559, 560; 356/614; 700/258
See application file for complete search history.

(56) References Cited

U.S. PATENT DOCUMENTS

| | | | |
|---|---|---|---|
| 4,799,170 A | 1/1989 | Nakaya et al. | |
| 4,888,877 A | 12/1989 | Enderle et al. | |
| 4,918,627 A | 4/1990 | Garcia et al. | |
| 5,665,896 A | 9/1997 | McMurtry | |
| 5,829,148 A | 11/1998 | Eaton | |
| 5,970,431 A | 10/1999 | He | |
| 5,973,788 A | 10/1999 | Pettersent et al. | |
| 6,041,274 A | 3/2000 | Onishi et al. | |
| 6,675,122 B1* | 1/2004 | Markendorf et al. | 702/150 |
| 7,213,344 B2 | 5/2007 | Jordil et al. | |
| 7,640,674 B2* | 1/2010 | Ferrari et al. | 33/502 |
| 2002/0032541 A1 | 3/2002 | Raab | |
| 2002/0087233 A1 | 7/2002 | Raab | |
| 2002/0189319 A1* | 12/2002 | Abbe | 73/1.01 |
| 2003/0069709 A1 | 4/2003 | Noda | |
| 2003/0078694 A1 | 4/2003 | Watanabe | |
| 2007/0005178 A1 | 1/2007 | Prestidge et al. | |

FOREIGN PATENT DOCUMENTS

| | | |
|---|---|---|
| DE | 198 05 155 | 8/1999 |
| DE | 102 61 336 | 7/2004 |
| DE | 103 24 833 B3 | 6/2005 |
| EP | 671602 | 9/1995 |
| JP | 58006406 | 1/1983 |
| JP | 60195616 | 10/1985 |
| JP | 2108910 | 4/1990 |
| JP | 9250920 | 9/1997 |
| JP | 9304013 | 11/1997 |
| JP | 2004/163296 | 6/2004 |
| JP | 2004/294311 | 10/2004 |

* cited by examiner

*Primary Examiner* — Manuel L Barbee
(74) *Attorney, Agent, or Firm* — Wolf, Greenfield & Sacks, P.C.

(57) ABSTRACT

A manipulable aid which is separate and distinct from the probe of a CMM permits a CMM operator to more directly interact with a CMM measurement volume to align a workpiece, configure a measurement path, and/or program a dimensional metrology application.

34 Claims, 9 Drawing Sheets

MANIPULABLE AID FOR DIMENSIONAL METROLOGY

FIELD OF THE INVENTION

This invention relates generally to manipulable aids, and more specifically to manipulable aids which may be used as programming aids for coordinate measurement machines (CMMs).

Discussion of the Related Art

Dimensional metrology includes the use of measurement equipment to determine the conformity of a workpiece to its intended dimensional design. To measure conformity of a workpiece, Coordinate Measuring Machines (CMMs), including both contact and non-contact CMMs, are often used. CMMs gather dimensional data regarding the location of points, edges, planes, surfaces and other part features. Operators and engineers analyze the dimensional data to determine how closely a workpiece matches its design. Various analytical tools, such as dimensional metrology software applications, assist the operators and engineers with this analysis.

As shown in FIG. 1, a typical CMM comprises a measuring apparatus 2, a controller 10, and a computer 12. In a bridge-type CMM, as shown in FIG. 1, measuring apparatus 2 includes a table 4 which extends generally in an XY plane, a bridge 6 which spans the table in the X direction (as shown in FIG. 1) and moves in the Y direction (as shown in FIG. 1), and a carriage 8 which is supported on the bridge 6 and moves in the X direction. Carriage 8 supports a Z-ram 9 which can move vertically, i.e., in the Z direction (as shown in FIG. 1). An articulating probe assembly 15, such as a stylus, is positioned at the end of Z-ram 9. The probe assembly may be, for example, a type of probe assembly disclosed in U.S. Pat. Nos. 7,213,344, 5,665,896, or 4,888,877, or as sold by Hexagon Metrology GmbH of Wetzlar, Germany, under the Leitz trademark.

Computer 12 and controller 10 cooperate to drive motors that move bridge 6, carriage 8, and Z-ram 9 for the purpose of measuring a workpiece 14 situated on table 4. A contact portion of articulating probe assembly 15 contacts the workpiece and includes switches or sensors that trigger computer 12 to measure the positions of the bridge, carriage, and Z-ram when contact is sensed by the switches or sensors.

Typically, technicians perform each of two steps as part of using a CMM. A first step is aligning a part, and a second step is programming a dimensional metrology application. The publication entitled, "Introduction to Coordinate Metrology," published by Brown & Sharpe, a division of Hexagon Metrology, Inc., © 2006, describes the concepts behind part alignment.

In the specific context of a Direct Computer Controlled (DCC) CMM, a technician typically manually moves the CMM probe assembly into contact with appropriate portions of a workpiece to collect preliminary measurements which can be used to determine: (1) the approximate location of the workpiece within the coordinate system of the CMM; and (2) the approximate locations of certain measurement-worthy features of the workpiece. The DCC CMM is then instructed to run an automatic measuring routine which determines to high degree of accuracy the locations of features to be measured. Among other benefits, initial part alignment helps to prevent the CMM probe from contacting the workpiece at an excessive speed or with excessive force when the CMM performs the computer controlled automatic measuring routine.

The instructions provided to the CMM for the automatic measuring routine may be generated by a dimensional metrology application, such as the PC-DMIS® brand metrology software sold by Wilcox Associates, Inc.

SUMMARY

The process of manually manipulating a probe on a CMM can be slow in some instances. Typically, a DCC CMM, or any CMM that includes motor-actuated axes that move the probe, is manually controlled using a jogbox or a similar device which includes a joystick for creating control signals to move the probe throughout the measurement volume. Control of the probe with a jogbox can be non-intuitive because the operator does not directly interact with the measurement volume. The operator controls the CMM remotely through the jogbox, and because this method does not allow the operator to employ a natural feel for the measurement volume, the operator typically moves the probe slowly about the workpiece.

Additionally, in some configurations, movement of a probe throughout a CMM measurement volume can be difficult when the probe is coupled to motor-actuated axes and the motors are not being used to move the probe.

According to one embodiment of the invention, a system includes a coordinate measuring machine having a measurement volume, a first probe, actuators configured to move the first probe within the measurement volume, and a first set of one or more sensors configured to measure positions of the first probe within the measurement volume. The system further includes a second probe, separate and distinct from the first probe, the second probe being manually movable within the measurement volume of the coordinate measuring machine. A second set of one or more sensors configured to sense information regarding positions of the second probe is also included in the system, as well as a processor. The processor is configured to calculate coordinate positions of the second probe based on at least the information sensed by the second set of sensors.

According to another embodiment of the invention, a method includes placing a workpiece within a measurement volume of a coordinate measuring machine, determining the location of the workpiece within the measurement volume, and manually moving a manual probe within the measurement volume of the coordinate measuring machine to contact a plurality of features on the workpiece, the manual probe being unsupported by components of the coordinate measuring machine. The method further includes detecting information regarding positions of the plurality of features, determining a measurement path routine based on the information regarding positions of the plurality of features, and controlling an automated probe to perform the measurement path routine to determine coordinate positions of the plurality of features, the automated probe being a different probe than the manual probe.

According to yet another embodiment of the invention, a manipulable aid system for use with a coordinate measuring machine includes a wireless manipulable aid having a touch probe, an electromagnetic radiation reflector, and a hand grasp area, one or more electromagnetic radiation emitters mountable to a coordinate measuring machine, one or more electromagnetic radiation sensors mountable to the coordinate measuring machine, and a computer storage medium including instructions which, when executed, instruct a processor to receive data from the electromagnetic radiation sensors, and generate a set of instructions based on the received data, the set of instructions being configured to control a coordinate measurement machine probe to contact a plurality of features on a workpiece.

According to a further embodiment of the invention, a system includes a coordinate measuring machine having a measurement volume, a first probe assembly including a first probe, actuators configured to move the first probe within the measurement volume, and a first set of one or more sensors configured to measure positions of the first probe within the measurement volume. The system further includes a second probe assembly including a second probe, the second probe assembly being separate and distinct from the first probe assembly, the second probe being movable by hand within the measurement volume of the coordinate measuring machine, and the second probe being configured to be supported only by a user during use. Also included in the system is a second set of one or more sensors configured to sense information regarding positions of the second probe while the second probe is supported only by a user.

According to another embodiment of the invention, a method includes placing a workpiece within a measurement volume of a measurement workspace, moving a first probe within the measurement volume of the measurement workspace to contact a plurality of features on the workpiece, detecting information regarding positions of the plurality of features, and determining a measurement path routine based on the information regarding positions of the plurality of features. The method further includes controlling an automated second probe of a coordinate measuring machine to perform the measurement path routine to determine coordinate positions of the plurality of features, the automated second probe being a separate probe from the first probe, and the coordinate measuring machine being remote from the measurement workspace.

According to yet another embodiment of the invention, a system comprises a first probe which is manually movable within a measurement volume of a measurement workspace. The system further includes a first set of one or more sensors configured to sense information regarding positions of the first probe when the first probe is brought into contact with each of a plurality of features. The system also includes a processor configured to determine a coordinate measuring machine measurement path routine based on the positions of the first probe, the coordinate measuring machine measurement path routine being configured to be performed by a coordinate measuring machine which is remote from the measurement workspace and the first probe.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention permit a CMM operator to more directly interact with a CMM measurement volume to align a workpiece and/or program a dimensional metrology application by way of a manipulable aid which is separate and distinct from the probe of the CMM. The handheld stylus may be a tactile probe combined with a jogbox or a penlike object. In use, the operator grasps the manipulable aid and moves it within the CMM measurement volume to contact various features of the workpiece. When the operator brings the manipulable aid into contact with the workpiece, sensors are triggered which provide information regarding the position of the manipulable aid, and this information is sent to a processor for processing and/or storage in a computer-readable medium. The information gathered from the manipulable aid may be used to align the workpiece, that is, to determine the location of the workpiece within the coordinate system of the CMM measurement space. The information additionally or alternatively may be used to preliminarily locate certain measurement-worthy features of the workpiece for use in creating a measurement path routine for the CMM probe.

In some embodiments, the manipulable aid may include a handheld stylus, and an electromagnetic radiation location system may be used to determine the position of the stylus within the measurement volume of the CMM. In this embodiment, radiation is emitted from one or more known locations into the measurement volume, and detectors detect the echo that reflects from the stylus. As will be discussed below, the emitted radiation may be laser radiation, or in some embodiments may be RF radiation or microwave radiation, to enable time-of-flight or phase-based distance measurement. The radiation may be highly directional, as with a laser for example. In other embodiments, the position of a manipulable aid is measured using other suitable sensor arrangements.

Figure 1:
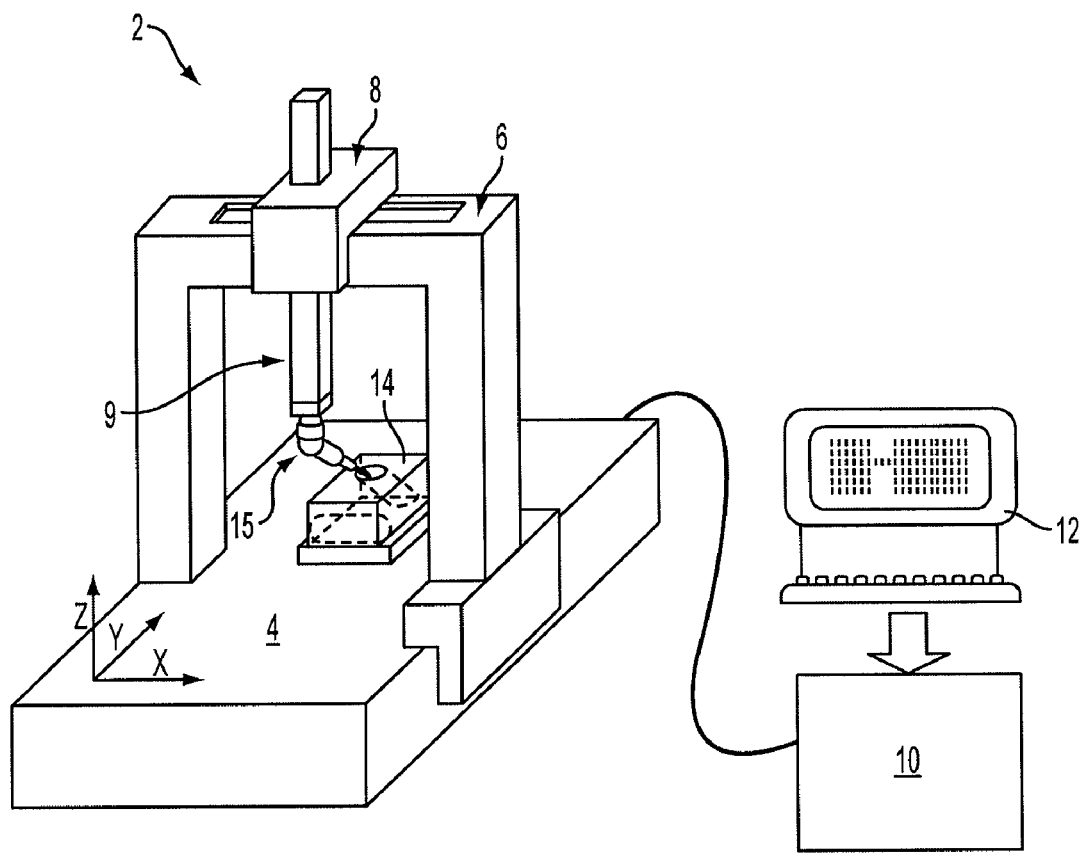
FIG. 1 is a perspective view of a typical coordinate measuring machine system.
Figure 2:
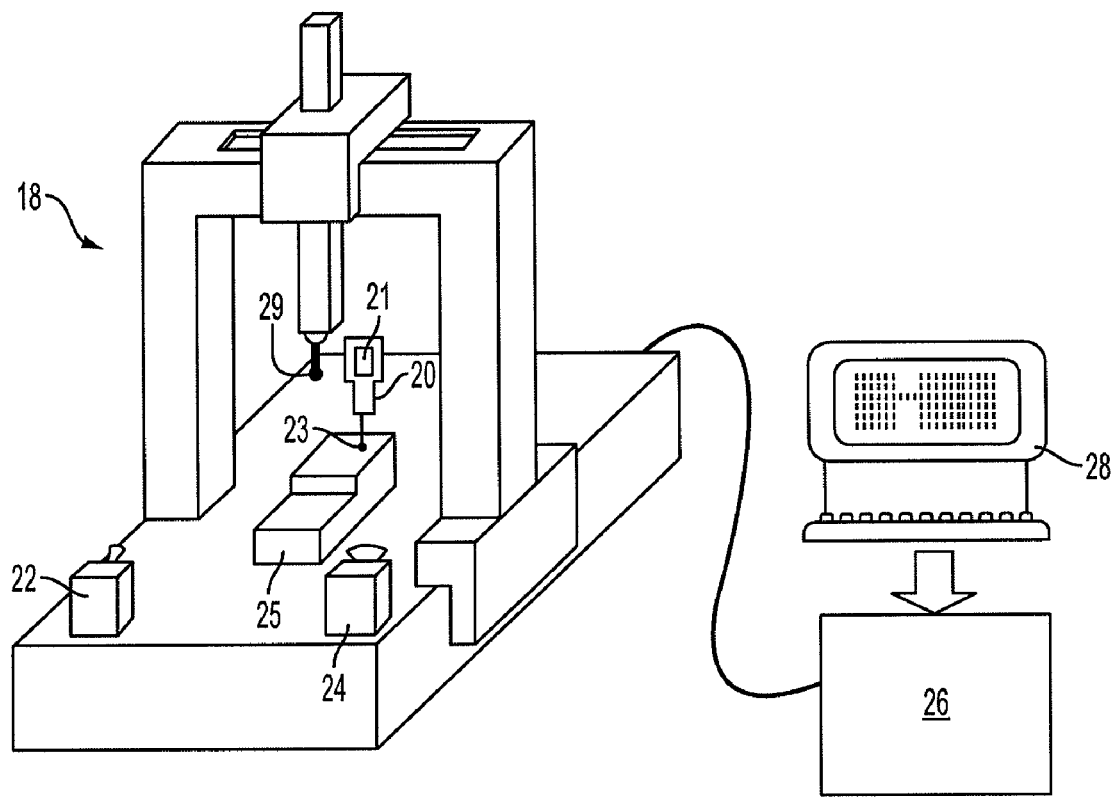
FIG. 2 is a perspective view of a coordinate measuring machine including a manipulable aid according to one embodiment of the invention.

Turning now to a detailed description of various embodiments, FIG. 2 shows a manipulable aid 20 which may be handheld and includes a probe 23 and a reflective portion 21. Manipulable aid 20 may be used with a workpiece 25. Reflective portion 21 works in association with a light detection and ranging (LIDAR) system 30 to locate probe 23 within the measurement volume of a CMM 18. While the CMM depicted in FIG. 2 is a bridge-type CMM, other types of CMMs may be used with embodiments of the invention. For example, a gantry-type CMM, a horizontal arm CMM, a measuring arm CMM, or any other suitable type of CMM may be used with various embodiments of the invention.

The LIDAR system 30 of FIG. 2 is based on the time-of-flight principle. An emitter 22 emits a light pulse, such as a laser pulse for example, which is subsequently reflected by reflective portion 21 to a receiver 24. The time from emission to receipt of the reflection from reflective portion 21 is used to calculate the total distance from emitter 22 to manipulable aid 20 to receiver 24. The position of manipulable aid 20 (and thus the position of probe 23 when in contact with a workpiece 25) can then be determined using the distance measurement and the known direction of the emitted laser pulse. The position of manipulable aid 20 may be measured at specific points on workpiece 25, and a measurement may be initiated by a user input, such as by pressing a button on manipulable aid 20. In some embodiments, measurements of the position of manipulable aid 20 may be automatically initiated when probe 23 contacts workpiece 25. In this manner, high frequency measurements may be made while probe 23 is moved along an edge of workpiece 25 or over a surface of workpiece 25.

Data from emitter 22 and receiver 24 may be communicated wirelessly or via a wired connection to a controller 26 and/or a computer 28 for position calculations. As discussed in more detail below, the preliminary position information provided by manipulable aid 20 and the LIDAR system 30 may be used as part of the creation of a measurement path routine for a probe 29 of CMM 18 to measure workpiece 25.

Figure 3:
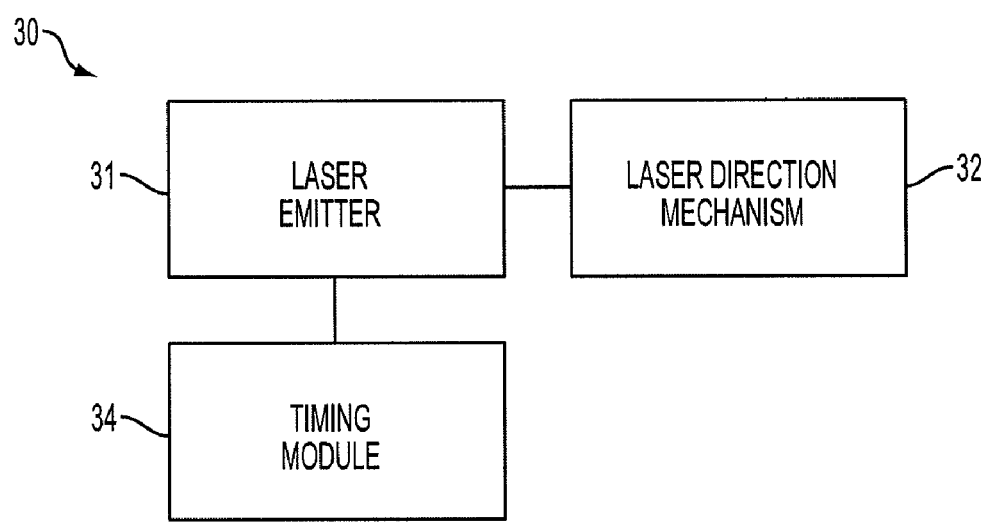
FIG. 3 is a block diagram illustrating the functions of a laser system according to one embodiment of the invention.

One embodiment of a laser-based LIDAR system 30 is shown in FIG. 3 and includes laser emitter 31, a laser direction mechanism 32, and a timing module 34. Laser emitter 31 may be any one of a number of well-known lasers, such as a diode-pumped laser, a semiconductor laser, a solid-state laser, and/or other suitable lasers. The laser should be configured to have adequate power such that a laser pulse can travel from emitter 22 to reflective portion 21 of the manipulable aid and back to receiver 24 at an intensity which can be detected by the receiver, regardless of the position of manipulable aid 20 within the measurement volume. Typical CMMs have a span of between one and thirty meters, although embodiments of the invention may be used with CMMs having distances of more than thirty meters or less than one meter.

The laser direction mechanism 32 may be any one of several of suitable devices. For example, laser direction mechanism 32 may include a plurality of mirrors (not shown) for directing an emitted laser pulse. Prisms may be used instead of, or in addition to, mirrors in any of the embodiments described herein. The mirrors may direct an echo along the same path as the corresponding emitted pulse. In one arrangement, two planar mirrors which are capable of being rotated around orthogonal (or substantially orthogonal) axes may be used. Such an arrangement is described in U.S. Pat. No. 5,988,862 and particularly FIG. 6A. U.S. Pat. No. 5,988,862 is incorporated by reference herein in its entirety, and particularly the description and drawing related to the embodiment of FIG. 6A. Alternatively, the laser direction mechanism 32 may comprise one or more rotating multi-faced mirrors (not shown). These embodiments of laser direction mechanism 32 typically can scan the laser within the measurement volume of the CMM, or direct the laser to a specific area. The laser direction mechanism 32 also may include sensors (e.g., encoders) or other elements (not shown) for determining the position of the mirrors, as well as optics for providing the laser beam with a desired shape or other property.

Timing module 34 may determine the time difference between emission of a laser pulse and receipt of the echo corresponding to that pulse. The timing module may include fiber optics or other optical paths for directing a portion of an emitted pulse to a sensor for starting a timer while simultaneously directing a portion of an emitted pulse outwardly into the measurement volume. Optical paths direct an echo to a receiver, such as an avalanche photodiode or PIN diode or other well-known receiver.

The LIDAR system 30 described in connection with FIG. 3 measures the orientation of a laser direction mechanism 32, and the orientation determines the direction of the output pulse. Even though laser direction mechanism 32 rotates, the direction of the echo may be taken as being identical to the orientation for the emitted pulse in some embodiments because the laser direction mechanism 32 typically moves only a negligible amount between pulse emission and echo detection. The orientation of the laser direction mechanism 32 coupled with the time of flight is used to determine the position of the target in a manner known to those of skill in the art.

Two aspects of time-of-flight systems may be addressed in some embodiments. First, objects other than the manipulable aid may create echoes. To address this aspect, manipulable aid 20 may have a highly reflective portion 21 that differentiates manipulable aid 20 from other objects in the measurement volume by the intensity of the echoes received by the LIDAR system. In some embodiments, an operator may confirm a processor's interpretation of a high-intensity echo as coming from manipulable aid 20, for example, via a suitable confirmation input A second aspect is that the orientation of the manipulable aid 20 itself may be unknown. That is, a LIDAR system 30 may not necessarily determine whether the manipulable aid is perpendicular to table 4 of the CMM or is oriented at an angle to table 4. To address this aspect, in some embodiments instructions may be provided to the operator to maintain the manipulable aid as nearly upright as possible. While the operator may allow the manipulable aid to deviate slightly from a perfectly upright position as a result of natural movement, this deviation typically introduces insignificant error. In some embodiments, if an operator wishes to orient the manipulable aid horizontally relative to the CMM table 4 to detect a bore hole or other horizontally-oriented feature, the operator can inform the dimensional metrology program that the manipulable aid is positioned horizontally via a suitable user interface.

In some embodiments, the LIDAR system 30 may continuously sweep the measurement volume and sense echoes that reflect from the manipulable aid 20. In other embodiments, emitter 22 may be targeted to emit toward certain areas based on the more recent positions of the manipulable aid 20.

Figure 4:
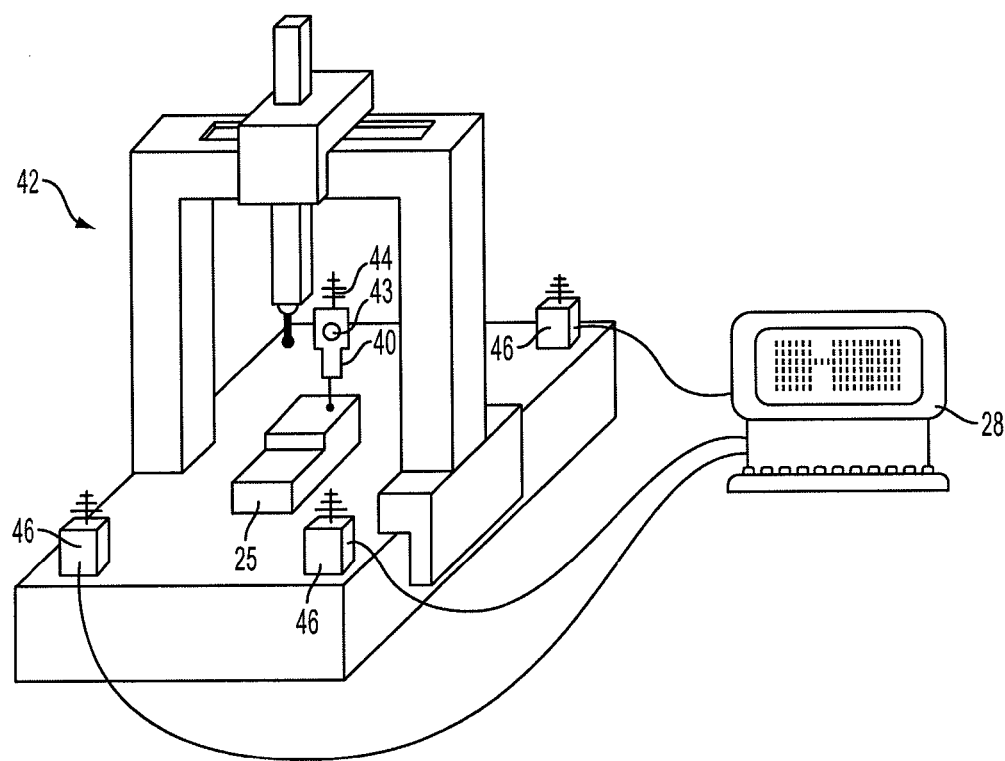
FIG. 4 is a perspective view of a measurement system including a plurality of transceivers according to one embodiment of the invention.

While the foregoing description has focused on light waves, such as laser pulses, for determining the location of the manipulable aid 20, a LIDAR system 30 also may use other frequencies such as RF or microwave frequencies. RF and microwave radiation is less directional than light, and may require several transceivers 46, as shown by way of example in FIG. 4. The RF or microwave radiation sensed by transceivers 46 allows determination of the position of the manipulable aid 20 through triangulation. A computer, such as computer 28 which is associated with the a measuring apparatus 42, may be specially programmed to determine the position of the manipulable aid 40. As with other embodiments, the manipulable aid 20 may be outfitted with an antenna 44, or a reflector 43 to provide strong echo signals to transceivers 46. Of course, a separate processor that is not necessarily associated with computer 28 may receive signals from the LIDAR system and determine the position of the manipulable aid. For example, a processor may include a dedicated hardware device for receiving the timing signals and determining position, a software module or hardware device embedded in a CMM controller, or some combination thereof.

Figure 5:
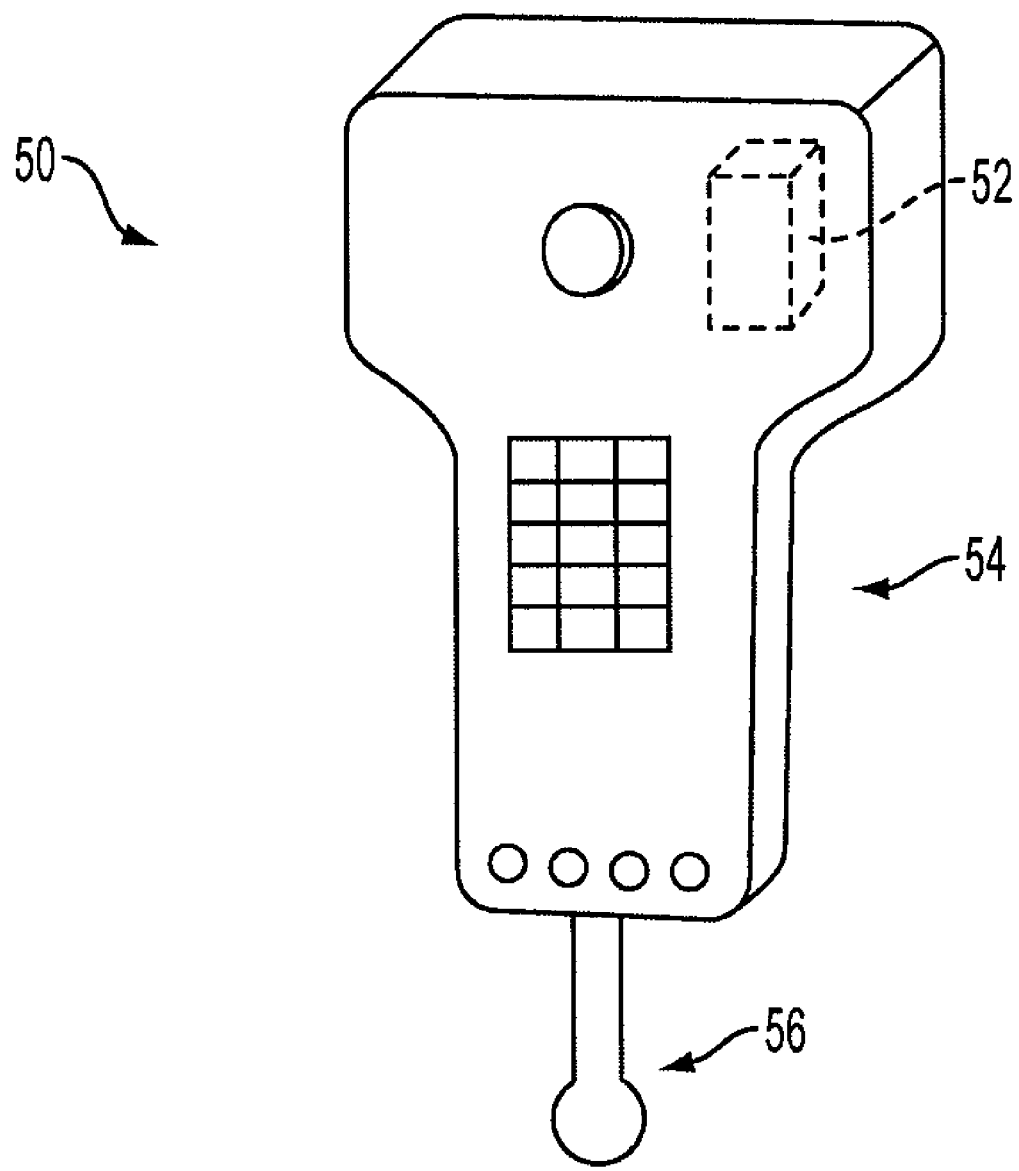
FIG. 5 is a perspective view of a manipulable aid including an accelerometer according to one embodiment of the invention.

In another embodiment, probe position may be determined by integrating the accelerations sensed by an accelerometer 52, as illustrated in FIG. 5. In this embodiment, a manipulable aid 50 may include a probe 56, accelerometer 52, and a handheld manual controller 54 which is electrically connected to a CMM controller. The CMM controller in turn may be connected to a computer (not shown). Of course, in some embodiments, communications between components may be achieved through wireless transmission, and handheld manual controller 54 may communicate directly with the computer. The accelerometer may be any suitable accelerometer, including, for example, a Tri-Axis Inertial-Measurement Unit that contains three angular rate sensors and three accelerometers. One such accelerometer is Model ADIS16355, as described in the article, "Tri-Axis Inertial-Measurement Units Combine Performance and Low Cost," *Electronic Design*, Aug. 2, 2007, p. 22. During use, the CMM controller receives signals from accelerometer 52 and passes them to a computer (not shown) which integrates the accelerations to obtain a position for the probe 56.

As is well known, accelerometers can suffer from drift. In some embodiments, a cradle (not shown) for manipulable aid 50 may be provided in a known position, and manipulable aid 50 can be placed in the cradle after each measurement or after a predetermined amount of time to allow recalibration of the system.

Figure 6:
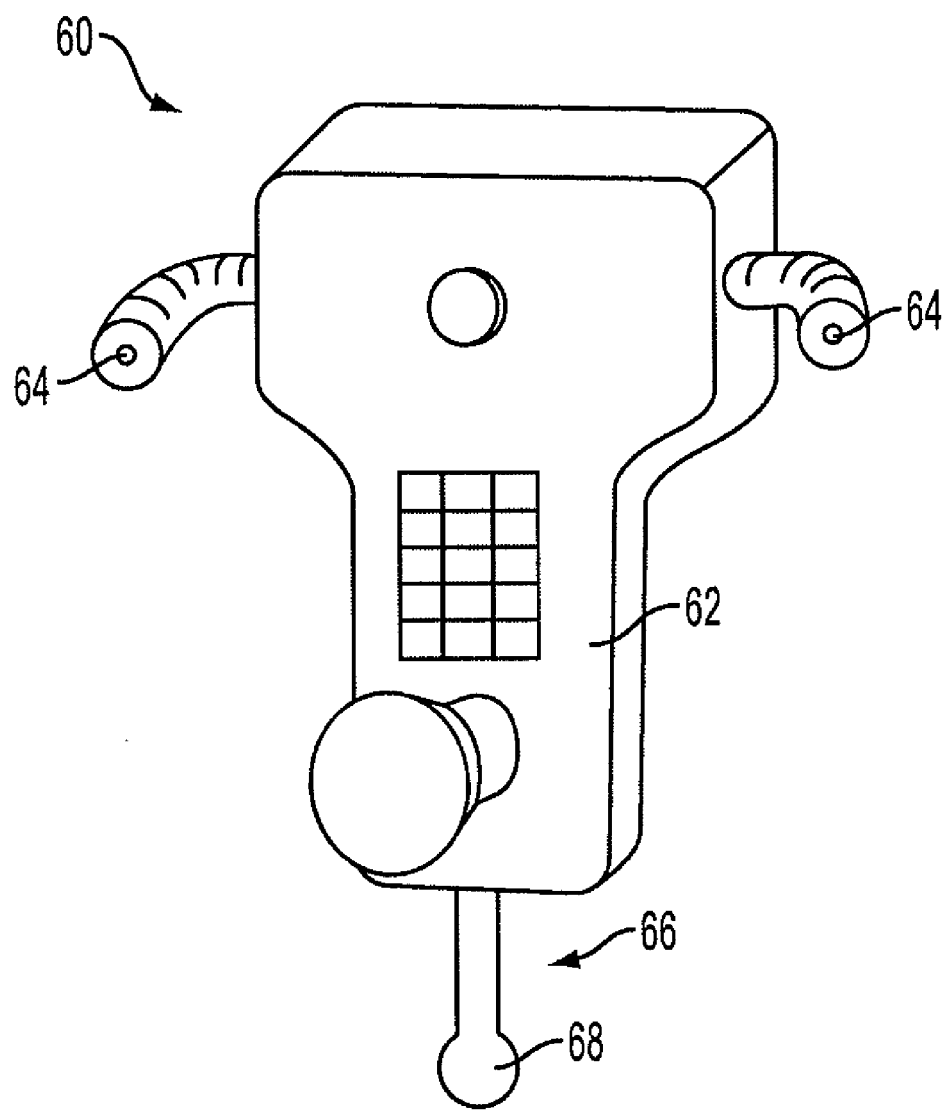
FIG. 6 is a perspective view of a manipulable aid as part of a jogbox, according to one embodiment of the invention.

Another embodiment of a manipulable aid 60 is illustrated in FIG. 6. Manipulable aid 60 may be used to measure position using the location system described in U.S. Pat. No. 5,973,788, which is incorporated by reference herein in its entirety. In this embodiment, the manipulable aid 60 comprises a jogbox 62 which includes a plurality of LEDs 64 (or other light source(s)) and a touch probe 66. A probe ball 68 at the end of probe 66 may be a ball of similar or identical construction as a probe ball which may be used with a coordinate measuring machine, such as the ONES CMM sold by Hexagon Metrology, Inc. of North Kingstown, R.I. under the Brown & Sharpe brand. In one embodiment of a location system associated with the manipulable aid 60, there may be one or more cameras and a laser range finder, embodiments of which are described in U.S. Pat. No. 5,973,788. The one or more cameras and the laser range finder may be mounted on the table of the CMM. The cameras and range finder may be mounted in any suitable arrangement, which in some embodiments may include mounting them at the corners of the table to avoid interference with workpiece measurement.

While the manipulable aids described in the foregoing embodiments are described either as taking the form of a combined jogbox and tactile probe, or a smaller, pen-like object, one of ordinary skill will appreciate that the manipulable aid may take either form in various embodiments, and may have any suitable arrangement. In many embodiments, the manipulable aid includes a stylus of known length point or probe which is designed to contact the workpiece.

In some embodiments, a non-contact CMM may include one or more sensors which are able to sense features of a workpiece or a CMM probe, and are also able to sense the position of a manipulable aid. For example, a laser scanning CMM may be configured to detect the position of a reflective manipulable aid in a first mode, and may be further configured to detect surfaces of a workpiece in a second mode. In both modes, the same laser detectors may be used to sense the reflected light. Other types of sensors may be used in embodiments which permit the same sensors, or at least some of the same sensors, to sense the position of a manipulable aid and also sense the position of a CMM probe and/or directly sense features of a workpiece.

While embodiments described above may include a manipulable aid that is supported only by a user during use, in some embodiments, a manipulable aid may be supported by the CMM and/or components attached to the CMM. For example, in the embodiment illustrated in FIG. 7, a manipulable aid 70 is attached to an articulated arm 72, such as the articulated arm described in U.S. Pat. No. 5,829,148, which is incorporated herein by reference in its entirety. The articulated arm 72 may be attached to the table of the CMM in a position where articulated arm 72 does not interfere with measurement of workpieces on the CMM using a probe 74 mounted to a Z-ram 76.

Figure 7:
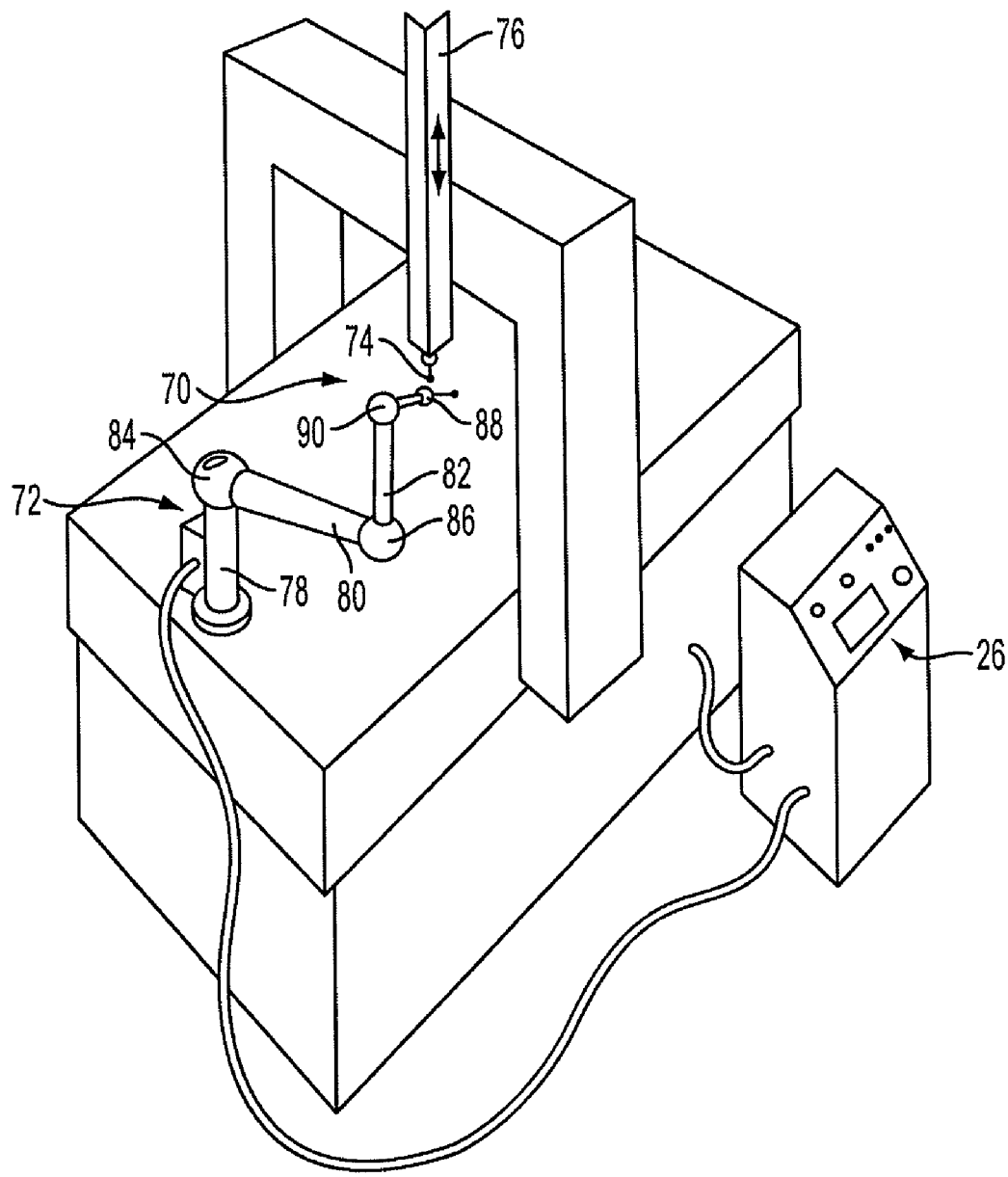
FIG. 7 is a perspective view of a CMM system including a manipulable aid according to another embodiment of the invention.

In the embodiment of FIG. 7, articulated arm 72 may include three members 78, 80, 82, which are interconnected by joints 84, 86, and a probe assembly 88 which is connected to member 82 by a joint 90. Each joint includes a rotary angle transducer (not shown), such as an optical encoder. When probe assembly 88 registers contact with a workpiece, values from the rotary angle transducers are sent to controller 26 or a computer for determination of the position of probe assembly 88.

Manipulable aids described herein can be used in various situations in which a user of a CMM wishes to locate a feature or object within the measurement volume of the CMM. For example, the user may use the manipulable aid to align a master workpiece on the table of the CMM. The user also may use the manipulable aid to locate features that are to be measured as part of a measuring program. In this manner, the manipulable aid can act as a programming aid to assist in the development of a measuring program including a measuring path routine.

Figure 8:
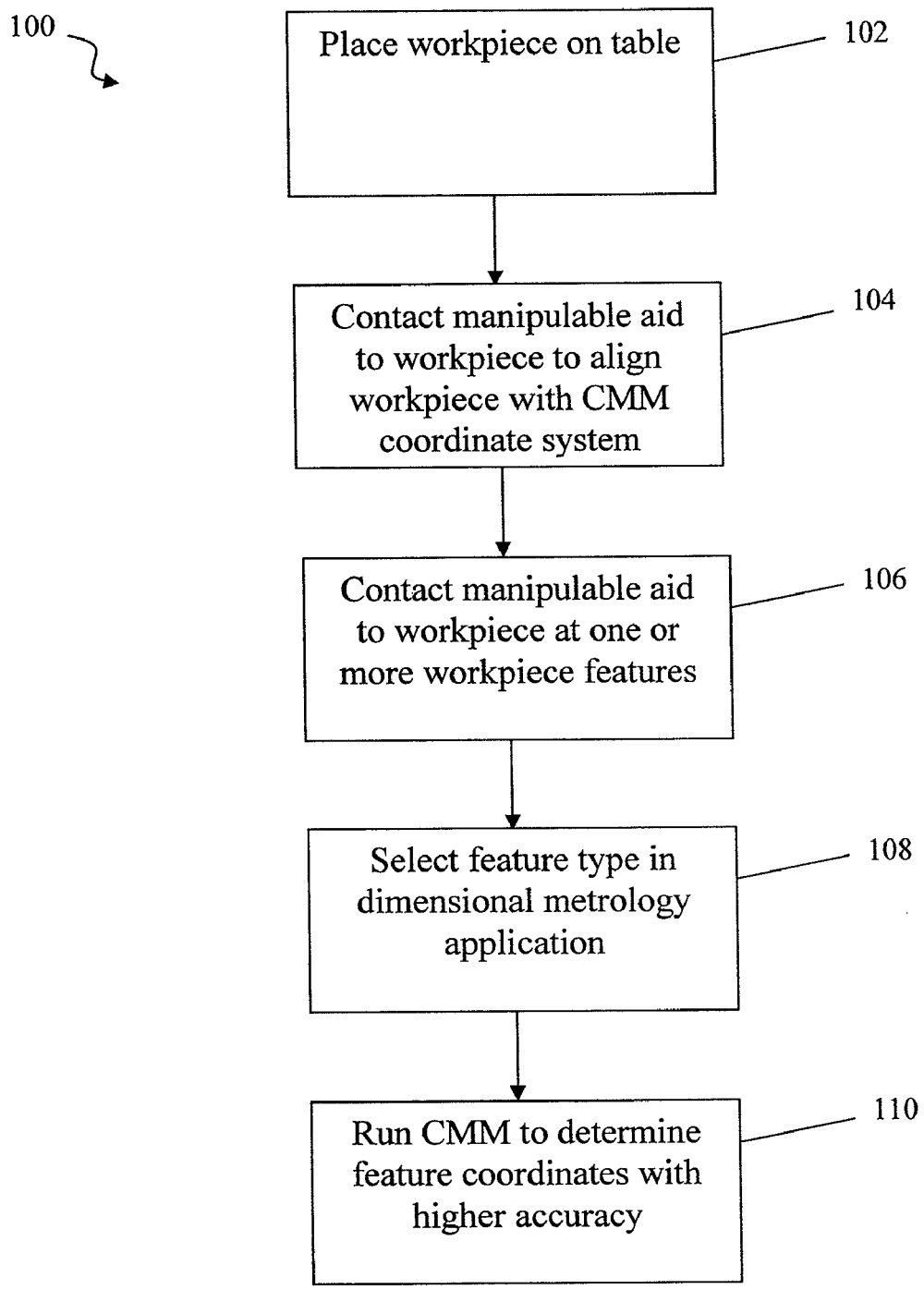
FIG. 8 is a block diagram illustrating a method of measuring a workpiece according to one embodiment of the invention.

FIG. 8 illustrates one embodiment of method 100 of using a manual manipulable aid as a programming aid. In a first act 102, a workpiece is placed on the table of the CMM. The workpiece may be a master workpiece or a production workpiece. Thereafter, in an act 104 the operator contacts points on the workpiece with the probe of the manipulable aid to establish a relationship between the coordinate system of the workpiece and the coordinate system of the CMM in an act 104. Suitable points of contact on the workpiece vary depending on the type of workpiece being measured, as is understood by one of ordinary skill in the art. In an act 106, after aligning the workpiece, the operator contacts features on the workpiece with the probe to collect preliminary coordinates for those features. In an act 108, the feature type is characterized, typically using a dimensional metrology software application, such as a dimensional metrology software application from the PC-DMIS® family of applications. In an act 110, the CMM runs in an automated mode in an act 110 to collect higher accuracy measurements of the features that were preliminarily measured with the manipulable aid.

In some embodiments, the data acquired for certain measurement-worthy features is used as part of determining a measurement path routine for a DCC CMM. A dimensional metrology software application may be used to generate the measurement path routine, and the resulting routine may include probe movements which search for a certain feature within a certain volumetric space based on the approximate measurement(s) provided by the manipulable aid. In this manner, the dimensional metrology software application is able to accept measurements having a lower accuracy than may typically be found in CMMs, including manually-operated CMMs, yet may still generate a measurement path routine which is usable on a high accuracy CMM.

The process for measuring production workpieces may have fewer acts than the method described with respect to FIG. 8. In a method of measuring a production workpiece or part, the production part is aligned on the CMM table by contacting the production part at certain points to establish a relationship between the coordinate system of the production part and the coordinate system of the CMM. The CMM thereafter runs an automatic measurement program without acts 106 and 108 being performed. In such an embodiment, it may not be necessary for the user to contact the manipulable probe to various features before running the automatic measurement program because the alignment process defines the locations of the features within the CMM measurement volume based on the information collected from the master workpiece.

In some embodiments, a workspace separate from a CMM may be used to generate preliminary data regarding feature positions on a workpiece, and the data may be used to generate a measurement path routine for a CMM to measure the features on the same workpiece and/or suitable other workpieces. In these embodiments, the measurement path routine may be transmitted to the CMM via a network connection.

Figure 9:
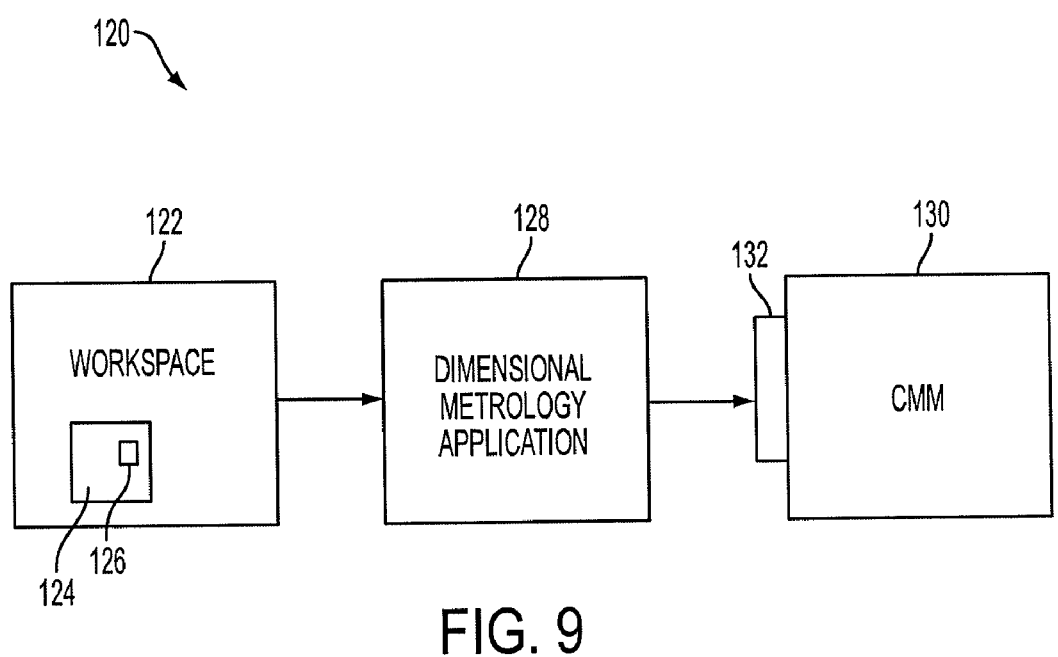
FIG. 9 is a block diagram illustrating a coordinate measurement system according to one embodiment of the invention.

For example, in one embodiment of a measurement system 120, as shown in the block diagram of FIG. 9, a workspace 122 which is remote from a CMM 130 may be provided with an articulated arm 124 and an associated probe 126 to gather preliminary data regarding a workpiece (not shown). The preliminary data may be output to a dimensional metrology application 128, or other suitable application, for processing to determine a measurement path routine. The measurement path routine may be communicated to a CMM controller 132 which controls CMM 130 to perform the measurement path routine to measure the workpiece or suitable other workpieces. In this manner, run time of the CMM is not used for preliminary data acquisition, which provides additional time for the CMM to be used for higher accuracy measurements. In some embodiments, the measurement path routine may be communicated to a plurality of CMM controllers.

The articulated arm used in the embodiment shown in FIG. 9 may be an articulated arm as shown in FIG. 7, or may be a different type of articulated arm. In some embodiments, a manipulable aid other than an articulated arm may be used, for example, one of the other embodiments of manipulable aids disclosed herein may be used. The manipulable aid that is used with the embodiment of FIG. 9 may be a manual manipulable aid, or in some embodiments, the manipulable aid may be an automated manipulable aid.

In some embodiments, the manipulable aid, such as an articulated arm, may be portable such that the arm is useable in many different workspaces. A portable manipulable aid may be particularly suitable for some embodiments disclosed herein because the application configured to generate a measurement path routine from the preliminary measurements may be capable of using lower accuracy measurements as part of the measurement path routine determination. More specifically, the application may accept lower accuracy measurements that may be associated with frequently mounting an articulated arm to a workspace, and/or the lower accuracy measurement that may be associated with using a manual manipulable aid in more than one workspace, while in other systems which require higher accuracy for a path generation software application, a portable manipulable aid may be undesirable.

According to some embodiments, systems described herein may include a controller and a database which control operation of the CMM. The controller and database combination may be implemented in any one of several ways. For example, the controller and database combination may be implemented using hardware, software or a combination thereof. When implemented in software, the software code can be executed on any suitable processor or collection of processors, whether provided in a single computer or distributed among multiple computers. It should be appreciated that any component or collection of components that perform the functions described herein can be generically considered to be one or more controllers that control these functions. The one or more controllers can be implemented in numerous ways, such as with dedicated hardware, or with general purpose hardware (e.g., one or more processors) that is programmed using microcode or software to perform the functions recited above. The one or more controllers may be included in one or more host computers, one or more storage systems, or any other type of computer that may include one or more storage devices coupled to the one or more controllers.

In this respect, it should be appreciated that one implementation of the embodiments of the present invention comprises at least one computer-readable medium (e.g., a computer memory, a floppy disk, a memory stick, a compact disk, a tape, etc.) encoded with a protocol in the form of a computer program (i.e., a plurality of instructions), which, when executed by the controller, performs the herein-discussed functions of the embodiments of the present invention. In addition, it should be appreciated that the reference to instructions or a controller which, when executed, performs the herein-discussed functions, is not limited to an application program running on a host computer. Rather, the various methods described herein in a generic sense reference any type of computer code (e.g., software or microcode) that can be employed to program a processor to implement the herein-discussed aspects of the present invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
a coordinate measuring machine having:
 a measurement volume;
 a first probe;
 actuators configured to move the first probe within the measurement volume; and
 a first set of one or more sensors configured to measure positions of the first probe within the measurement volume;
a second probe, separate and distinct from the first probe, the second probe being manually movable within the measurement volume of the coordinate measuring machine;
a second set of one or more sensors configured to sense information regarding positions of the second probe; and
a processor, wherein the processor is configured to calculate coordinate positions of the second probe based on at least the information sensed by the second set of sensors;
an electromagnetic radiation emitter; and
a reflective element attached to the second probe;
wherein the second set of one or more sensors is configured to receive electromagnetic radiation which has been emitted from the electromagnetic radiation emitter and has reflected off of the reflective element.

2. A system as in claim 1, wherein at least one of the actuators is provided on a main body of the coordinate measuring machine.

3. A system as in claim 2, wherein the main body of the coordinate measuring machine comprises a movable bridge, a carriage movably mounted to the bridge, and a vertical ram movably mounted to the carriage, wherein at least one of the actuators is provided on the bridge, and at least one of the actuators is provided on the carriage.

4. A system as in claim 1, further comprising a computer configured to prepare a measurement path routine for the first probe based on the calculated coordinate positions of the second probe.

5. A system as in claim 1, wherein the electromagnetic radiation emitter comprises a laser emitter.

6. A system as in claim 1, wherein the second probe is attached to an articulating arm comprising at least three members, the articulating arm having at least two joints which allow pivoting of the members relative to each other, each of the joints having an angle transducer.

7. A system as in claim 1, wherein the second probe is mounted to a jogbox.

8. A system as in claim 1, further comprising a jogbox, wherein the second probe is movable via controls on the jogbox.

9. A system as in claim 1, wherein the second set of one or more sensors comprises an accelerometer.

10. A system comprising:
a coordinate measuring machine having:
a measurement volume;
a first probe;
actuators configured to move the first probe within the measurement volume; and
a first set of one or more sensors configured to measure positions of the first probe within the measurement volume;
a second probe, separate and distinct from the first probe, the second probe being manually movable within the measurement volume of the coordinate measuring machine;
a second set of one or more sensors configured to sense information regarding positions of the second probe; and
a processor, wherein the processor is configured to calculate coordinate positions of the second probe based on at least the information sensed by the second set of sensors;
wherein the second probe includes a hand grasp portion and the second probe is not mechanically mounted to the coordinate measuring machine.

11. A system as in claim 10, further comprising:
an electromagnetic radiation emitter configured to emit radio or microwave frequencies; and
an antenna and a transmitter attached to the second probe; wherein
the second set of one or more sensors is configured to receive electromagnetic radiation which has been emitted from the electromagnetic radiation emitter and has been retransmitted by the transmitter of the second probe.

12. A system as in claim 10, further comprising a computer configured to prepare a measurement path routine for the first probe based on the calculated coordinate positions of the second probe.

13. A system as in claim 10, further comprising:
an electromagnetic radiation emitter; and
a reflective element attached to the second probe;
wherein the second set of one or more sensors is configured to receive electromagnetic radiation which has been emitted from the electromagnetic radiation emitter and has reflected off of the reflective element.

14. A system as in claim 10, further comprising:
an electromagnetic radiation emitter configured to emit radio or microwave frequencies; and
an antenna and a transmitter attached to the second probe;
wherein the second set of one or more sensors is configured to receive electromagnetic radiation which has been emitted from the electromagnetic radiation emitter and has been retransmitted by the transmitter of the second probe.

15. A system as in claim 10, wherein the second probe is mounted to a jogbox.

16. A system as in claim 10, wherein the second set of one or more sensors comprises an accelerometer.

17. A method comprising:
placing a workpiece within a measurement volume of a coordinate measuring machine;
determining the location of the workpiece within the measurement volume;
manually moving a manual probe within the measurement volume of the coordinate measuring machine to contact a plurality of features on the workpiece, the manual probe being unsupported by components of the coordinate measuring machine;
detecting information regarding positions of the plurality of features;
determining a measurement path routine based on the information regarding positions of the plurality of features;
controlling an automated probe to perform the measurement path routine to determine coordinate positions of the plurality of features, the automated probe being a different probe than the manual probe.

18. A method as in claim 17, wherein determining the location of the workpiece within the measurement volume comprises manually moving the probe within the measurement volume of the coordinate measuring machine to contact at least first and second points on the workpiece, the probe being unsupported by components of the coordinate measuring machine.

19. A method as in claim 17, wherein controlling the automated probe comprises driving a bridge, a carriage mounted to the bridge, and a vertical ram mounted to the carriage.

20. A method as in claim 17, wherein manually moving a manual probe comprises manually grasping a probe assembly and moving the probe assembly within the measurement volume.

21. A manipulable aid system for use with a coordinate measuring machine, the system comprising:
a wireless manipulable aid having a touch probe, an electromagnetic radiation reflector, and a hand grasp area;
one or more electromagnetic radiation emitters mountable to a coordinate measuring machine;
one or more electromagnetic radiation sensors mountable to the coordinate measuring machine; and
a computer storage medium including instructions which, when executed, instruct a processor to receive data from the electromagnetic radiation sensors, and generate a set of instructions based on the received data, the set of instructions being configured to control a coordinate measurement machine probe to contact a plurality of features on a workpiece.

22. A system comprising:
a coordinate measuring machine having:
a measurement volume;
a first probe assembly including a first probe;
actuators configured to move the first probe within the measurement volume; and
a first set of one or more sensors configured to measure positions of the first probe within the measurement volume;

a second probe assembly including a second probe, the second probe assembly being separate and distinct from the first probe assembly, the second probe being movable by hand within the measurement volume of the coordinate measuring machine, and the second probe being configured to be supported only by a user during use; and a second set of one or more sensors configured to sense information regarding positions of the second probe while the second probe is supported only by a user; wherein the second set of one or more sensors comprises sensors which are included in the first set of one or more sensors.

23. A system as in claim 22, wherein the second set of one or more sensors comprises sensors separate and distinct from the first set of one or more sensors.

24. A system as in claim 22, wherein the second probe is connected to a computer with a communication wire.

25. A system as in claim 22, further comprising an electromagnetic radiation emitter, wherein the second set of one or more sensors is configured to receive electromagnetic radiation which has been emitted from the electromagnetic radiation emitter and has reflected off of the reflective element.

26. A system comprising:
a first probe which is manually movable within a measurement volume of a measurement workspace;
a first set of one or more sensors configured to sense information regarding positions of the first probe when the first probe is brought into contact with each of a plurality of features; and
a processor configured to determine a coordinate measuring machine measurement path routine based on the positions of the first probe, the coordinate measuring machine measurement path routine being configured to be performed by a coordinate measuring machine which is remote from the measurement workspace and the first probe.

27. A system as in claim 26, further comprising a coordinate measuring machine and a coordinate measuring machine controller configured to implement the coordinate measuring machine measurement path routine, the coordinate measuring machine being remote from the measurement workspace and the first probe and comprising an automated second probe.

28. A method comprising:
placing a workpiece within a measurement volume of a measurement workspace;
moving a first probe within the measurement volume of the measurement workspace to contact a plurality of features on the workpiece;
detecting information regarding positions of the plurality of features;
determining a measurement path routine based on the information regarding positions of the plurality of features;
controlling an automated second probe of a coordinate measuring machine to perform the measurement path routine to determine coordinate positions of the plurality of features, the automated second probe being a separate probe from the first probe, and the coordinate measuring machine being remote from the measurement workspace.

29. A method as in claim 28, wherein moving a first probe within the measurement volume comprises manually moving a first manual probe within the measurement volume.

30. A method as in claim 29, wherein a portable articulated arm supports the first probe, the method further comprising mounting the portable articulated arm relative to the measurement workspace.

31. A method as in claim 29, wherein an electromagnetic radiation reflective element is attached to the second probe, and wherein detecting information regarding positions of the plurality of features comprises:
emitting electromagnetic radiation; and
with a set of one or more sensors, receiving electromagnetic radiation which has reflected off of the reflective element.

32. A system comprising:
a coordinate measuring machine having:
a measurement volume;
a first probe assembly including a first probe;
actuators configured to move the first probe within the measurement volume; and
a first set of one or more sensors configured to measure positions of the first probe within the measurement volume;
a second probe assembly including a second probe, the second probe assembly being separate and distinct from the first probe assembly, the second probe being movable by hand within the measurement volume of the coordinate measuring machine, and the second probe being configured to be supported only by a user during use; wherein
the first set of one or more sensors is configured to measure positions of the second probe within the measurement volume.

33. A system comprising:
a coordinate measuring machine having:
a measurement volume;
a first probe;
actuators configured to move the first probe within the measurement volume; and
a first set of one or more sensors configured to measure positions of the first probe within the measurement volume;
a second probe, separate and distinct from the first probe, the second probe being manually movable within the measurement volume of the coordinate measuring machine;
a second set of one or more sensors configured to sense information regarding positions of the second probe;
a processor, wherein the processor is configured to calculate coordinate positions of the second probe based on at least the information sensed by the second set of sensors; and
a computer configured to prepare a measurement path routine for the first probe based on the calculated coordinate positions of the second probe.

34. A system comprising:
a coordinate measuring machine having:
a measurement volume;
a first probe;
actuators configured to move the first probe within the measurement volume; and
a first set of one or more sensors configured to measure positions of the first probe within the measurement volume;
a second probe, separate and distinct from the first probe, the second probe being manually movable within the measurement volume of the coordinate measuring machine;

a second set of one or more sensors configured to sense information regarding positions of the second probe;
a processor, wherein the processor is configured to calculate coordinate positions of the second probe based on at least the information sensed by the second set of sensors
an electromagnetic radiation emitter configured to emit radio or microwave frequencies; and
an antenna and a transmitter attached to the second probe; wherein the second set of one or more sensors is configured to receive electromagnetic radiation which has been emitted from the electromagnetic radiation emitter and has been retransmitted by the transmitter of the second probe.

\* \* \* \* \*